United States Patent
Bardiau

[11] 3,724,300
[45] Apr. 3, 1973

[54] FRONTAL MULTI-SPINDLE LATHES

[75] Inventor: Roger Bardiau, La Celle-St-Cloud, France

[73] Assignee: Societe S.E.C.O.R., Courbevoie, France

[22] Filed: Nov. 3, 1970

[21] Appl. No.: 86,418

[30] Foreign Application Priority Data

July 11, 1969 France.................................6938496

[52] U.S. Cl............................................82/3, 29/37
[51] Int. Cl. ................................................B23b 9/10
[58] Field of Search....................82/3, 2 D; 29/37, 27

[56] References Cited

UNITED STATES PATENTS

| | | | |
|---|---|---|---|
| 1,130,277 | 3/1915 | Hartness | 82/3 |
| 3,245,290 | 4/1966 | Johansson | 82/3 |
| 2,473,306 | 6/1949 | Schreiber | 82/3 |

Primary Examiner—Leonidas Vlachos
Attorney—John Lezdey

[57] ABSTRACT

This invention relates to an improvement in lathes comprising a frame constituting a headstock in which the spindles are mounted to rotate. It is characterized in that around the headstock and the spindles are arranged a plurality of beds, mounted to slide over the whole length of said headstock along axes parallel to the axes of the spindles, said beds carrying tool-holder carriages. The invention may be used in frontal multi-spindle lathes.

7 Claims, 3 Drawing Figures

FRONTAL MULTI-SPINDLE LATHES

The present invention relates to an improvement in frontal multi-spindle lathes.

Frontal lathes are known which comprise a plurality of horizontal spindles mounted to rotate on the headstock. With this type of lathe, certain difficulties may be met with for the machining of certain pieces, due to the position of the tool-holder carriages located on the frontal face of the lathe near the spindles.

The improvement according to the present invention has for its main object to improve the guiding of the tools and therefore to obtain a much greater accuracy of machining.

In accordance with the present invention, there are arranged about the headstock and the spindles a plurality of beds mounted to slide over the whole length of said headstock along axes parallel to the axes of the spindles, said beds carrying tool-holder carriages at their end located opposite said spindles.

Moreover, in order to increase the range of possibilities of machining on the multi-spindle lathes, an axial displacement of said spindles is provided without limitation of stroke. The displacement of the spindles may be controlled with the aid of a screw, cam or other mechanical means. In the case of feed by screws, the servo-control may be effected by a numerical control.

The displacement of the spindles presents many advantages; including that of effecting the machining of all types of screw-cutting and the machining of workpieces by frontal reproduction.

The invention will be better understood, and objects other than those set forth above, will become apparent, when consideration is given to the following detailed description thereof. Such description makes reference to the annexed drawings wherein generally the same reference numerals or characters have usually been employed to denote the same or analogous elements, and wherein.

Figure 1:
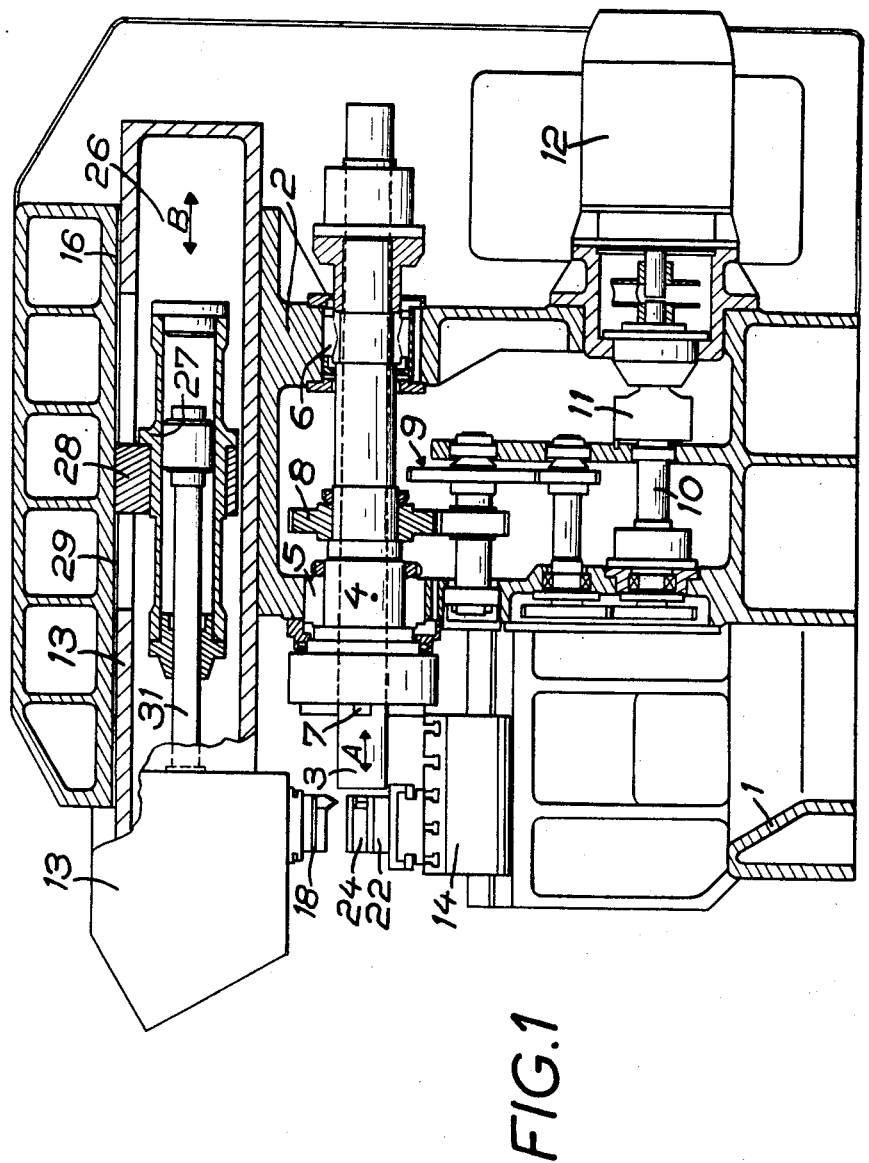
FIG. 1 shows a side elevational and sectional view of a frontal lathe with two spindles.
Figure 2:
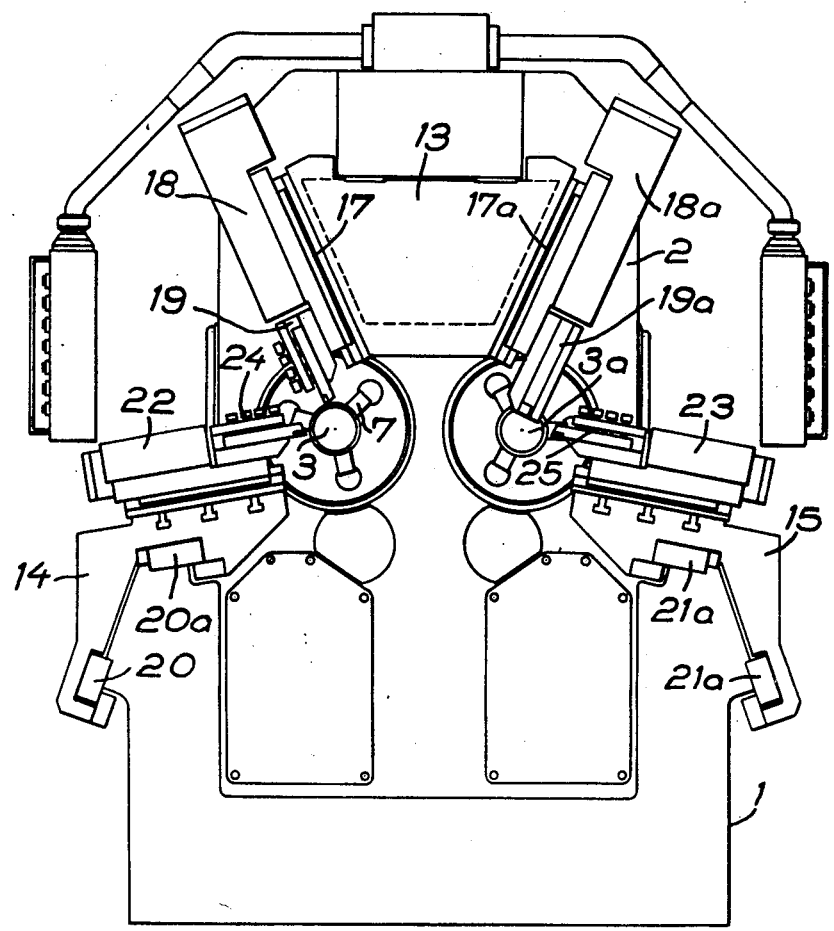
FIG. 2 is an elevational view of the side of the front face of the machine shown in FIG. 1.
Figure 3:
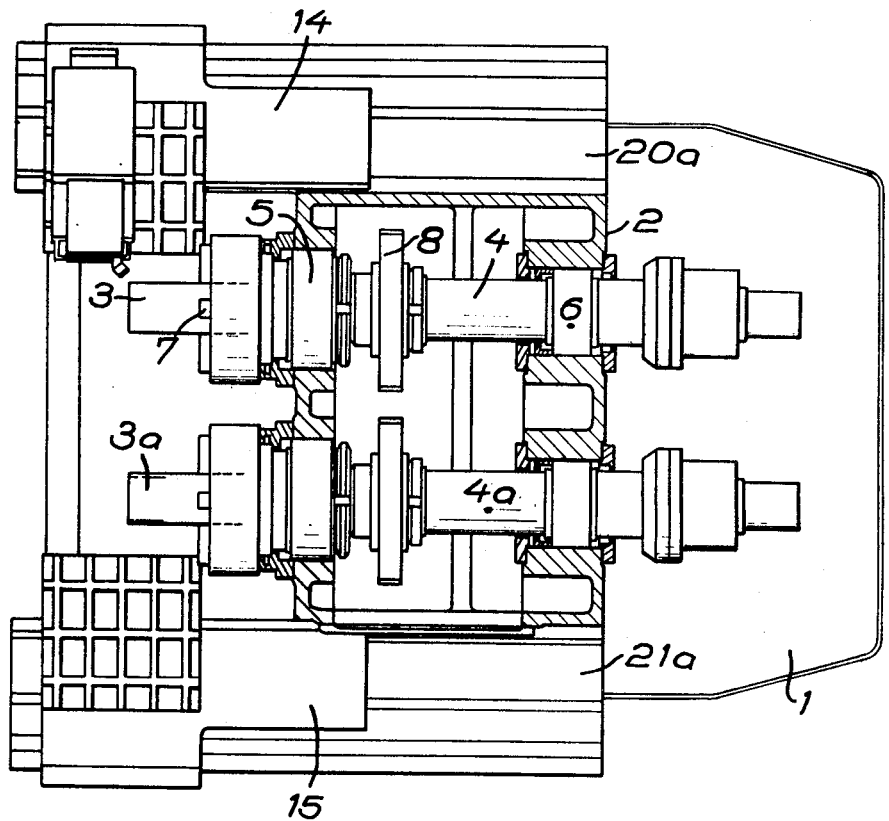
FIG. 3 is a plan view of the same machine shown in FIG. 1.

Directing attention now to the drawings, FIGS. 1, 2 and 3 show an embodiment of a frontal lathe with two spindles, comprising a frame 1 constituting in its upper part a headstock 2 in which are rotatably mounted two spindles 3 and 3a sliding axially and respectively in the direction of the double arrow A in too hollow shafts 4, 4a, which rest by means of two bearings 5 and 6 on the headstock 2. The spindles 3, 3a are rendered unitary in rotation with the shafts 4, 4a by means of keys such as 7 which permit the axial slide of the spindles.

The axial displacement of the spindles 3, 3a is controlled by a known mechanical means (not shown in the drawing) which may be contituted by a screw or a cam.

In the case of feed by screws, the servo-control may be effected by means of a numerical control.

On each of the hollow shafts 4, 4a is keyed a pinion 8 which is connected by a gear transmission 9 of known type to a drive shaft 10 itself connected to a motor 12 by means of a coupling or clutch member 11.

Around the headstock 2 and the spindles 3, 3a are arranged beds 13, 14 and 15 sliding in the direction of the double arrow B over the whole length of the headstock along axes parallel to the axes of the spindles. The main bed 13 is embedded in the upper part of the headstock 2 and mounted to slide in an opening 16 made in the body of the headstock and having faces for guiding the bed.

At one of its ends directed opposite the spindles 3, 3a, the bed 13 comprises two inclined slides 17, 17a on which two carriages 18, 18a carrying tool supports 19, 19a are respectively mounted to slide. The carriages 18, 18a slide on the bed 13 along axes located in a plane perpendicular to the axes of the spindles.

There are laterally provided on each side of the spindles on the frame 1 of the lathe, two sets of slides 20, 20a and 21, 21a, extending over the whole length of the frame and on which two beds 14, 15 are respectively mounted to slide. On each bed 14, 15 there is fixed a carriage 22, 23 provided with a tool-holder 24, 25, said carriage 22, 23 being mounted to slide along an axis located in a plane perpendicular to the axes of the spindles.

FIG. 1 shows a means of driving the main bed 13, which has a cavity 26 in which is arranged a jack cylinder 27 unitary with the headstock 2 by a support member 28. The bed 13 has a slot 29 to permit passage of the support member 28.

In the jack cylinder 27 there is slidably mounted a piston 30 subjected on its two faces to the action of a hydraulic fluid, and the rod 31 of which is unitary at one of its ends with the bed 13 thus enabling the displacement thereof to be controlled, in the direction of arrow B with respect to the headstock 3.

The invention is of course not limited to the sole embodiment described and shown, but covers, on the contrary, all the variants thereto.

What is claimed is:

1. An improvement in frontal multi-spindle lathes comprising a frame constituting a headstock in which the spindles are mounted to rotate, said improvement comprising a plurality of beds arranged around said headstock and spindles being mounted to slide over the whole length of said headstock along axes parallel to the axes of the spindles, said spindles being mounted to slide axially in the headstock by means of rotary members, said beds carrying tool-holder carriages at their end located opposite said spindles.

2. An improvement in frontal multi-spindle lathes as defined in claim 1, wherein each bed mounted to slide in the headstock is provided with at least one tool-holder carriage slidably mounted on a slide, along an axis located in a plane perpendicular to the axes of the spindles.

3. An improvement in frontal multi-spindle lathes as defined in claim 1, wherein at least one of the beds mounted to slide in a corresponding opening in the headstock has a cavity in which is mounted a jack cylinder unitary with the headstock and in which is slidably mounted a piston whose rod is unitary with one of the ends of the bed.

4. An improvement in frontal multi-spindle lathes as defined in claim 1, wherein the frame of the lathe has slides extending parallel to the axes of the spindles and on which are slidably mounted the beds carrying the tool-holder carriages.

5. An improvement in frontal multi-spindle lathes as defined in claim 1, wherein the lathe comprises two parallel spindles and three sliding beds, the main embedded one of which being located in the upper part of the headstock carrying, by means of two inclined slides, two tool-holder carriages and two lateral beds located in the lower part of the headstock each comprising a tool-holder carriage.

6. An improvement in frontal multi-spindle lathes as defined in claim 1, wherein the means for driving the spindles for their slide are constituted by mechanical means comprising a screw capable of being servo-controlled by a numerical control.

7. An improvement in frontal multi-spindle lathes as defined in claim 1, wherein the drive by sliding of the spindles is ensured by means of a cam.

* * * * *